United States Patent [19]

Cordova et al.

[11] Patent Number: 5,440,965
[45] Date of Patent: Aug. 15, 1995

[54] ARMOR SYSTEMS

[75] Inventors: David S. Cordova, Midlothian; Kevin M. Kirkland, Richmond, both of Va.

[73] Assignee: AlliedSignal Inc., Morris Township, Morris County, N.J.

[21] Appl. No.: 112,925

[22] Filed: Aug. 30, 1993

Related U.S. Application Data

[60] Division of Ser. No. 924,566, Aug. 5, 1992, Pat. No. 5,343,796, which is a continuation of Ser. No. 490,179, Mar. 8, 1990, abandoned.

[51] Int. Cl.$^6$ ............................................. F41H 5/04
[52] U.S. Cl. ................................. 89/36.02; 428/911
[58] Field of Search ........................ 89/36.02; 109/80; 428/911

[56] References Cited

U.S. PATENT DOCUMENTS

| | | |
|---|---|---|
| 4,057,359 | 11/1977 | Grooman . |
| 4,181,768 | 1/1980 | Severin . |
| 4,403,012 | 9/1983 | Harpell et al. . |
| 4,574,105 | 3/1986 | Donovan . |
| 4,608,717 | 9/1986 | Dunbavand . |
| 4,623,574 | 11/1986 | Harpell et al. . |
| 4,660,223 | 4/1987 | Fritch . |
| 4,681,792 | 7/1987 | Harpell et al. ..................... 428/911 |
| 4,681,792 | 7/1987 | Harpell et al. . |
| 4,737,401 | 4/1988 | Harpell et al. . |
| 4,820,568 | 4/1989 | Harpell et al. ..................... 428/911 |
| 4,944,974 | 7/1990 | Zachariades . |

FOREIGN PATENT DOCUMENTS

2151015 10/1971 Germany .

*Primary Examiner*—Stephen M. Johnson
*Attorney, Agent, or Firm*—Melanie L. Brown; John E. Thomas

[57] ABSTRACT

An armor system useful, for example, as a shroud, comprising a first pliable, cut resistant fibrous layer and a second pliable fibrous layer is disclosed. The first layer is arranged to receive an impact from a large projectile prior to the second layer and engages the projectile to slow its velocity. The second layer is substantially coextensive with the first and dissipates the incoming energy of the impact to resist complete penetration of the second layer by the projectile, preferably by deforming in response to the impact. Both layers comprise fibers having a tensile modulus of at least about 200 g/d, and an energy-to-break of at least about 8 J/g and a tenacity equal to or greater than about 10 g/d. In another embodiment, the layers are reversed relative to the impact face of the system so that the second layer becomes the first layer and is resistant to projectiles impacting the system, while the first layer becomes the second layer and resists deformation of the system by projectile impacts. Any projectile which completely penetrates the first layer is engaged by the second layer to slow its velocity and prevent complete penetration of the second layer. This armor system provides excellent ballistic resistance with enhanced deformation control.

14 Claims, 2 Drawing Sheets

ARMOR SYSTEMS

This application is a division of application Ser. No. 924,566, filed Aug. 5, 1992, now U.S. Pat. No. 5,343,796 which is a continuation of 490,179 filed on Mar. 8, 1990, now abandoned.

BACKGROUND OF THE INVENTION

1. Field of the Invention

The present invention relates to armor systems. More particularly, the present invention relates to a first multi-layer armor system which can be a shroud for the containment of large, high velocity cutting projectiles, and to a second multi-layer armor system which is high velocity impact/ballistic resistant and minimizes deformation and penetrations from such an impact.

2. Prior Art

In the summer of 1989, a blade/blade fragment broke away from the turbine engine of an airborne aircraft and severed the aircraft's hydraulic system. The aircraft crash-landed soon after. Shrouds to contain flying blade fragments (projectiles) from a failed turbine engine to protect vital equipment in close proximity are known—these shrouds are formed from multiple layers of loosely woven aramid, such as Kevlar ®, fabric Similarly, shields to protect aircraft engines from damage by flying fragments from a source external to the engine are known; these can be soft armor shields formed from layers of woven aramid fabric, metal shields, or a combination of the two (see U.S. Pat. No. 4,057,359, hereby incorporated by reference).

In either event, with the number of woven fabric layers heretofore utilized, these prior art shrouds/shields are not as effective with respect to high velocity cutting impacts of a rapidly rotating engine blade which fractures and is hurled away from the higher power, larger engines of today. An obvious solution would be to increase the number of fabric layers. However, this solution suffers the same disadvantage of some of the metallic shields available, excessive weight and expense. Therefore, a lightweight armor system which could function as a projectile containing shroud is desirable. Such an armor system would have utility in many areas, i.e., wherever there is a potential for failure of equipment with high speed moving parts that could break into large fragments and become high velocity projectiles that cut and tear their way through adjacent parts/machinery.

Applicants have discovered such an armor system, and in the course of such discovery have also discovered a ballistic resistant armor system which minimizes armor deformation after a high velocity impact or ballistic impact. An armor system can stop an impacting object from completely penetrating the system and yet deform (or bulge) so badly on its non-impact side that damage occurs to the equipment or person being protected by the armor system.

Ballistic resistant articles such as vests, helmets, hard and soft armor, structural members of helicopters and other military equipment, vehicle panels, briefcases, raincoats and umbrellas containing high strength fibers are known. Fibers conventionally used in these articles include aramid fibers such as poly(p-phenylene terephthalamide), graphite fibers, nylon fibers, ceramic fibers, high strength polyethylene fibers, e.g., SPECTRA ®, glass fibers and the like. For many applications, such as vests or parts of vests, the fibers are used in a woven or knitted fabric.

U.S. Pat. No. 4,623,574 discloses the formation of prepreg sheets comprised of elastomer coated high strength fibers which are substantially parallel and aligned along a common fiber direction. The patent teaches that the prepreg sheets can be plied together, with successive sheets being rotated relative to the first sheet, to form simple composite materials.

U.S. Pat. No. 4,181,768 teaches lightweight, rigid armor formed by press laminating alternating layers of 6,6 nylon film and aramid fabric. The fabric can be a nonwoven such as a needle punched felt.

U.S. Pat. No. 4,574,105 teaches a flexible, penetration resistant panel comprised of face plies of woven poly(p-phenylene terephthalamide) and backing plies of nonwoven polyamide, preferably needled polyamide felt. This patent teaches that the reverse configuration (face plies of polyamide felt backed with woven Kevlar fiber plies) decreases the ballistic limit velocity by 200 ft/sec.

U.S. Pat. No. 4,608,717 teaches a flexible, protective armor comprising layers of aramid fiber fabric which sandwich a trauma attenuation layer of feathers, foam or felt. The layers are drawn together, preferably by stitching. There is no teaching of a felt comprising fiber with high tensile properties.

U.S. Pat. No. 4,623,574, commonly assigned, teaches a ballistic resistant composite comprising a network of high strength fibers which are substantially coated with an elastomeric matrix material. U.S. Pat. No. 4,737,401, also commonly assigned, teaches a ballistic resistant article which comprises at least one network of high strength extended chain polyethylene, polypropylene, polyvinyl alcohol or polyacrylonitrile fiber having a denier of not more than 500 and a tensile modulus of at least about 200 g/denier. In both of these patents, the network can be a felt.

U.S. Pat. No. 4,660,223 teaches body armor comprising an assemblage of panels, each panel consisting of an inner face ply of titanium metal bonded to a strike face ply of aramid fiber woven cloth. The assemblage of panels is held in a predetermined relationship by first and second layers of felt material, preferably of aramid fibers, which are bonded with adhesive plies to the inner and strike faces of the panels. The felt plies permit the panels to move relative to one another and thus avoid inhibiting body movement of the wearer.

U.S. Pat. No. 4,681,792, commonly assigned, teaches a flexible ballistic resistant article having first and second portions each comprising a plurality of fibrous layers where the resistance to displacement of fibers in layers where the resistance to displacement of fibers in each layer of the second portion is greater than that of each layer in the first portion. The layers of the first portion consist essentially of uncoated fibers comprising fiber selected from the group of polyolefin fibers, polyvinyl alcohol fibers and polyacrylonitrile fibers having a tensile modulus of at least 300 g/d and a tenacity of at least about 15 g/d, and the layers of the second portion consist essentially of uncoated fibers. According to the patent, woven fibrous layers exhibit a higher resistance to fiber displacement than nonwoven layers.

The present invention, was developed in an attempt to overcome the deficiencies of the prior art.

BRIEF DESCRIPTION OF THE INVENTION

The present invention provides an armor system, preferably soft, comprising a first pliable, cut resistant fibrous layer and a second pliable, impact/ballistic energy absorbing fibrous layer. The first layer is arranged to receive an impact from a large projectile prior to the second layer and engages the projectile to slow its velocity. The second layer is substantially coextensive with the first layer and dissipates the incoming energy of the impact to resist complete penetration of the second layer by the projectile, preferably by deforming and acting in response to the impact. Both layers comprise fibers having a tensile modulus of at least about 200 g/d, and an energy-to-break of at least about 8 J/g and a tenacity equal to or greater than about 10 g/d.

This armor system is not only effective at containing large, high velocity cutting projectiles but also regular ammunition. Other advantages of this invention are higher performance over the prior art as well as a weight reduction on the order of 30% (for same fiber types).

The present invention also provides an improved jet engine system that includes a jet engine and a nacelle. The improvement is an armor system comprising a first pliable, cut resistant fibrous layer and a second pliable fibrous layer substantially coextensive with the first layer. The second layer is located closer to the nacelle than the first layer, and the first layer is located closer to the jet engine than the second layer. The first layer engages any projectile thrown by said engine to slow its velocity. The second layer dissipates the incoming energy to the impact to resist complete penetration of the second layer by the projectile. Both layers comprise fibers having a tensile modulus of at least about 200 g/d, and an energy-to-break of at least about 8 J/g and a tenacity equal to or greater than about 10 g/d.

In an alternate jet engine system that includes a jet engine and a nacelle, the improvement is also an armor system comprising a first pliable, cut resistant fibrous layer and a second pliable fibrous layer substantially coextensive with the first layer. The second layer is located closer to the nacelle than the first layer, and the first layer being located closer to the jet engine than the second layer. The first layer comprises a plurality of networks selected from the group consisting of an uncoated nonwoven network of randomly oriented fibers and an uncoated knitted, preferably tightly, network of fibers. The second layer comprises a plurality of networks selected from the group consisting of a loosely woven network of fibers, an open knitted network of fibers, a braided network of fibers, and a nonwoven network of oriented fibers. Both layers again comprise fibers having a tensile modulus of at least about 200 g/d, and an energy-to-break of at least about 8 J/g and a tenacity equal to or greater than about 10 g/d.

In the course of developing this armor system, applicants further discovered that when the layers are arranged so that the second layer receives an impact from a projectile first, followed by the first layer, then the system has excellent high velocity impact or ballistic resistance with even less deformation of the non-impact layer. In this system, the first layer (the second layer of the embodiment previously described) is arranged to receive an impact from a projectile prior to the second layer (the first layer of the embodiment previously described). The first layer is resistant to the impact, and the second layer minimizes deformation of the system by the projectile impact to the first layer. Furthermore, any projectile which completely penetrates the first layer is engaged by the second layer to slow its velocity and prevent complete penetration of the second layer. Both layers comprise fibers having a tensile modulus of at least about 200 g/d, an energy to break of at least 8 J/g and a tenacity equal to or greater than about 10 g/d.

This second armor system is advantageously used against smaller projectiles/fragments, but is ineffective alone against the large, high velocity cutting projectiles which can be contained by the system previously described. These smaller projectiles/fragments may even be from explosions and have velocities similar to or lower than the large projectiles. For vests, blunt trauma can be reduced by this system.

The two described systems can be used in conjunction with one another, as long as weight constraints permit, to provide a system capable of stopping a large, high velocity cutting projectile regardless of impact face and also of resisting a ballistic threat with minimum deformation. Such a system would minimally comprise three layers, the first and third of which are like those of the first layer of the first armor system described above, and the second of which is like the second layer of the first armor system described above. The second layer is sandwiched between the first and third layers for this third embodiment.

BRIEF DESCRIPTION OF THE DRAWINGS

In the accompanying drawings.

DETAILED DESCRIPTION OF THE INVENTION

By fiber is meant an elongate body, the length dimension of which is much greater than the transverse dimensions of width and thickness. Accordingly, the term fiber includes monofilament, multifilament, ribbon, strip, staple and other forms of chopped, cut or discontinuous fiber and the like having regular or irregular cross-sections. Fiber and filament are used interchangeably hereafter.

By network is meant tapes or fibers arranged in configurations of various types. For example, the plurality of fibers can be grouped together to form a twisted or untwisted yarn. The fibers of yarn may be formed as a felt, knitted or woven (plain, basket, satin and crow feet weaves, etc.) into a network, fabricated into a nonwoven fabric (random or ordered orientation), arranged in a parallel array, layered, or formed into a fabric by any of a variety of conventional techniques.

The cross-sections of fibers for use in this invention may vary widely. They may be of circular or of flat or of oblong or of irregular or regular multi-lobal cross-section having one or more regular or irregular lobes projecting from the linear or longitudinal axis of the filament. It is particularly preferred that the fibers be of substantially circular, flat or oblong cross-section, most preferably the former.

The diameter of the fibers and the thickness of the network may vary widely. In general, the smaller the diameter and the thinner the network, the greater the ballistic protection provided; and conversely, the greater the diameter of the fiber and the greater the thickness of the networks, the lower the ballistic protection provided.

The type of fibers used may vary widely and can be metallic, semi-metallic, inorganic and/or organic fibers. It is crucial, however, that a sufficient weight percent of cut resistant fibers or combination of fibers with high tensile properties be used to achieve the indicated properties of the layers of the armor systems. Other fibers, however, may be included by blending for a variety of reasons. Fibers having the high tensile properties desired are those having a tenacity equal to or greater than about 10 g/d, a tensile modulus equal to or greater than about 200 g/d and an energy-to-break equal to or greater than about 8 Joules/gram (J/g). Preferred fibers are those having a tenacity equal to or greater than about 15 g/d, a tensile modulus equal to or greater than about 300 g/d and an energy-to-break equal to or greater than about 20 J/g. Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 900 g/d, and the energy-to-break is equal to or greater than about 27 J/g. In the practice of this invention, fibers of choice have a tenacity equal to or greater than about 35 g/d, the tensile modulus is equal to or greater than about 1500 g/d and the energy-to-break is equal to or greater than about 50 J/g.

Illustrative of useful organic filaments are those composed of polyesters, polyolefins, polyetheramides, fluoropolymers, polyethers, celluloses, phenolics, polyesteramides, polyurethanes, epoxies, aminoplastics, silicones, polysulfones, polyetherketones, polyetheretherketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly(pxylylene sebacamide), poly(2,2,2-trimethyl-hexamethylene terephthalamide), poly(piperazine sebacamide), poly(metaphenylene isophthalamide) (Nomex) and poly(p-phenylene terephthalamide) (Kevlar); aliphatic and cycloaliphatic polyamides, such as the copolyamide of 30% hexamethylene diammonium isophthalate and 70% hexamethylene diammonium adipate, the copolyamide of up to 30% bis(-amidocyclohexyl)methylene, terephthalic acid and caprolactam, polyhexamethylene adipamide (nylon 66), poly(butyrolactam) (nylon 4), poly(9-aminonoanoic acid) (nylon 9), poly(enantholactam) (nylon 7), poly(capryllactam) (nylon 8), polycaprolactam (nylon 6), poly(p-phenylene terephthalamide), polyhexamethylene sebacamide (nylon 6,10), polyaminoundecanamide (nylon 11), polydodecanolactam (nylon 12), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclohexyl)methane 1,10-decanedicarboxamide] cycloaliphatic and aromatic polyesters such as poly(1,4-cyclohexylidene dimethyl eneterephthalate) cis and trans, poly(ethylene-1,5-naphthalate), poly(ethylene-2,6-naphthalate), poly(1,4-cyclohexane dimethylene terephthalate) (trans), poly(decamethylene terephthalate), poly(ethylene terephthalate), poly (ethylene isophthalate), poly (ethylene oxybenzoate), poly (parahydroxy benzoate), poly (dimethylpropiolactone), poly (decamethylene adipate), poly (ethylene succinate), poly(ethylene azelate), poly(decamethylene sabacate), poly($\alpha,\alpha$-dimethylpropiolactone), and the like.

Also illustrative of useful organic filaments are those of liquid crystalline polymers such as lyotropic liquid crystalline polymers which include polypeptides such as poly -benzyl L-glutamate and the like; aromatic polyamides such as poly(1,4-benzamide), poly(chloro-1-4-phenylene terephthalamide), poly(1,4-phenylene fumaramide), poly (chloro-1,4-phenylene fumaramide), poly (4,4'-benzanilide trans, trans-muconamide), poly (1,4-phenylene mesaconamide), poly (1,4-phenylene) (trans-1,4-cyclohexylene amide), poly(chloro-1,4-phenylene) (trans-1,4-cyclohexylene amide), poly(1,4-phenylene 1,4-dimethyl-trans-1,4'-cyclohexylene amide), poly(1,4-phenylene 2.5-pyridine amide), poly(chloro-1,4-phenylene 2.5-pyridine amide), poly(3,3'-dimethyl-4,4'-biphenylene 2.5 pyridine amide), poly(1,4-phenylene 4,4'-stilbene amide), poly (chloro-1,4-phenylene 4,4'-stilbene amide), poly (1,4-phenylene 4,4'-azobenzene amide), poly (4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3,8-phenanthridinone terephthal amide), poly(4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-amide), poly(1,4-phenylene 2,6-naphthal amide), poly(1,5-naphthalene terephthal amide), poly(3,3'-dimethyl-4,4-biphenylene terephthal amide), poly(3,3'-dimethoxy-4,4'-biphenylene terephthal amide), poly(3,3'-dimethoxy-4,4-biphenylene 4,4'-bibenzo amide) and the like; polyoxamides such as those derived from 2,2'-dimethyl-4,4'-diamino biphenyl and chloro-1,4-phenylene diamine; polyhydrazides such as poly chloroterephthalic hydrazide, 2,5-pyridine dicarboxylic acid hydrazide) poly(terephthalic hydrazide), poly(terephthalicchloroterephthalic hydrazide) and the like; poly(amidehydrazides) such as poly(-terephthaloyl 1,4 aminobenzhydrazide) and those prepared from 4-aminobenzhydrazide, oxalic dihydrazide, terephthalic dihydrazide and para-aromatic diacid chlorides; polyesters such as those of the compositions include poly(oxy-trans-1,4-cyclohexyleneoxycarbonyl-trans-1,4-cyclohexylenecarbonyl-b-oxy-1,4-phenyleneoxyteraphthaloyl) and poly(oxy-cis-1,4-cyclohexyleneoxycarbonyl-trans-1,4-cyclohexylenecarbonyl-b-oxy-1,4-phenyleneoxyterephthaloyl) in methylene chloride-o-cresol poly(oxy-trans-1,4-cyclohexylene oxycarbonyl-trans-1,4-cyclohexylenecarbonyl-b-oxy-(2-methyl-1,4-phenylene)oxy-terephthaloyl) in 1,1,2,2-tetrachloroethane-o-chlorophenol-phenol (60:25:15 vol/vol/vol), poly[oxy-trans-1,4-cyclohexyleneoxycarbonyl-trans-1,4-cyclohexylenecarbonyl-b-oxy(2-methyl-1,3-phenylene)oxy-terephthaloyl] in ochlorophenol and the like; polyazomethines such as those prepared from 4,4'-diaminobenzanilide and terephthalaldephide, methyl-1,4-phenylenediamine and terephthalaldehyde and the like; polyisocyanides such as poly($\alpha$-phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyotropic crystalline polymers with heterocyclic units such as poly(1,4-phenylene-2,6-benzobisthiazole) (PBT), poly(1,4-phenylene-2,6-benzobisoxazole) (PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phenylene-4-phenylquinoline] poly[1,1'-(4,4'-biphenylene)-6,6'-bis(4-phenylquinoline)] and the like; polyorganophosphazines such as polyphosphazine, polybisphenoxyphosphazine, poly[bis(2,2,2' trifluoroethylene) phosphazine] and the like; metal polymers such as those derived by condensation of trans-bis(tri-n-butylphosphine)platinum dichloride with a bisacetylene or trans-bis(tri-n-butylphosphine)bis(1,4-butadinynyl)-platinum and similar combinations in the presence of cuprous iodine and an amide; cellulose and cellulose derivatives such as esters of cellulose as for example triacetate cellulose, acetate cellulose, acetatebutyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydroxydiphenyl, copolymers of phydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments are those composed of extended chain polymers formed by polymerization of $\alpha,\beta$-unsaturated monomers of the formula:

$$R_1R_2-C=CH_2ps$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha,\beta$-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(4-methoxystyrene), poly(5-methyl-1-hexene), poly(4-methylpentene), poly(1-butene), polyvinyl chloride, polybutylene, polyacrylonitrile, poly(methyl pentene-1), poly(vinyl alcohol), poly(vinylacetate), poly(vinyl butyral), poly(vinyl chloride), poly(vinylidene chloride), vinyl choloride-vinyl acetate chloride copolymer, poly (vinylidene fluoride), poly (methyl acrylate), poly(methyl methacrylate), poly(methacrylonitrile), poly(acrylamide), poly(vinyl fluoride), poly(vinyl formal), poly(3-methyl-1-butene), poly (4-methyl-1-butene), poly (4-methyl-1-pentene), poly (1-hexane), poly (5-methyl-1-hexene), poly(1-octadecene), poly (vinyl cyclopentane), poly (vinylcyclohexane), poly (a-vinylnaphthalene), poly (vinyl methyl ether), poly (vinylethylether), poly (vinyl propylether), poly (vinyl carbazole), poly(vinyl pyrrolidone), poly(2-chlorostyrene), poly(4-chlorostyrene), poly (vinyl formate), poly (vinyl butyl ether), poly (vinyl octyl ether), poly (vinyl methyl ketone), poly (methylisopropenyl ketone), poly (4-phenylstyrene) and the like.

Illustrative of useful inorganic filaments for use in the present invention are glass fibers such as fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers which include "saffil" fiber in eta, delta, and theta phase form, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

In the preferred embodiments of the invention, the networks are fabricated from high molecular weight polyethylene filament, high molecular weight polypropylene filament, aramid filament, high molecular weight polyvinyl alcohol filament, high molecular weight polyacrylonitrile filament, liquid crystalline polymer filament or mixtures thereof.

U.S. Pat. No. 4,457,985, hereby incorporated by reference, generally discusses such high molecular weight polyethylene and polypropylene filaments. In the case of polyethylene, suitable filaments are those of molecular weight of at least 150,000, preferably at least 300,000, more preferably at least one million and most preferably between two million and five million. Such extended chain polyethylene (ECPE) filaments may be grown in solution as described in U.S. Pat. No. 4,137,394 or U.S. Pat. No. 4,356,138, or may be a filament spun from a solution to form a gel structure, as described in German Off. 3 004 699 and GB 2051267, and especially described in U.S. Pat. No. 4,551,296, also hereby incorporated by reference. As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated by reference. Depending upon the formation technique, the draw ratio and temperatures, and other conditions, a variety of properties can be imparted to these filaments. The tenacity of the filaments should be at least about 10 g/d, preferably at least about 15 g/d, more preferably at least about 25 g/d and most preferably at least about 35 g/d. Similarly, the tensile modulus of the filaments, as measured by an Instron tensile testing machine, is at least about 200 g/d, preferably at least about 500 g/d, more preferably at least about 1000 g/d and most preferably at least about 1500 g/d. The energy-to-break of the filaments is at least about 8 J/g, preferably at least about 25 J/g, more preferably at least about 40 J/g and most preferably at least about 50 J/g. These highest values for tenacity, tensile modulus and energy-to-break are generally obtainable only by employing solution grown or gel filament processes. High strength polyethylene fiber known as Spectra ® is commercially available from Allied-Signal, Inc.

Similarly, highly oriented polypropylene of molecular weight at least 200,000, preferably at least one million, and more preferably at least two million, may be used. Such high molecular weight polypropylene may be formed into reasonably well oriented filaments by techniques described in the various references referred to above, and especially by the technique of U.S. Pat. Nos. 4,663,101 and 4,784,820, and U.S. patent application Ser. No. 069 684, filed Jul. 6, 1987 (see published application WO 89 00213). Since polypropylene is a much less crystalline material than polyethylene and contains pendant methyl groups, tenacity values achievable with polypropylene are generally substantially lower than the corresponding values for polyethylene. Accordingly, a suitable tenacity is at least about 10 g/d, preferably at least about 12 g/d, and more preferably at least about 15 g/d. The tensile modulus for polypropylene is at least about 200 g/d, preferably at least about 250 g/d, and more preferably at least about 300 g/d. The energy-to-break of the polypropylene is at least about 8 J/g, preferably at least about 40 J/g, and most preferably at least about 60 J/g.

High molecular weight polyvinyl alcohol filaments having high tensile modulus are described in U.S. Pat. No. 4,440,711, hereby incorporated by reference. Preferred polyvinyl alcohol filaments will have a tenacity of at least about 10 g/d, a modulus of at least about 200 g/d and an energy-to-break of at least about 8 J/g, and particularly preferred PV-OH filaments will have a tenacity of at least about 15 g/d, a modulus of at least about 300 g/d and an energy-to-break of at least about 25 J/g. Most preferred PV-OH filaments will have a tenacity of at least about 20 g/d, a modulus of at least about 500 g/d and an energy-to-break of at least about 30 J/g. Suitable PV-OH filament having a weight average molecular weight of at least about 200,000 can be produced, for example, by the process disclosed in U.S. Pat. No. 4,599,267.

In the case of polyacrylonitrile (PAN), PAN filament for use in the present invention are of molecular weight of at least about 400,000. Particularly useful PAN filament should have a tenacity of at least about 10 g/d and an energy-to-break of at least about 8 J/g. PAN filament having a molecular weight of at least about 400,000, a tenacity of at least about 15 to about 20 g/d and an energy-to-break of at least about 25 to about 30 J/g is most useful in producing ballistic resistant articles. Such filaments are disclosed, for example, in U.S. Pat. No. 4,535,027.

In the case of aramid filaments, suitable aramid filaments formed principally from aromatic polyamide are described in U.S. Pat. No. 3,671,542, which is hereby incorporated by reference. The aramid filament will have a tenacity of at least about 15 g/d, a modulus of at least about 400 g/d and an energy-to-break of at least about 8 J/g. Preferred aramid filament will have a tenacity of at least about 20 g/d, a tensile modulus of at least about 500 g/d and an energy-to-break at least about 20 J/g, and particularly preferred aramid filaments will have a tenacity of at least about 20 g/d, a modulus of at least about 1000 g/d and an energy-to-break of at least about 20 J/g. Most preferred aramid filaments will have a tenacity of at least about 22 g/d, a modulus of at least about 900 g/d and an energy-to-break of at least about 27 J/g. For example, poly(p-phenylene terephthalamide) filaments produced commercially by Dupont Corporation under the trade name of Kevlar ® 29, 49, 129 and 149 and having moderately high moduli and tenacity values are particularly useful in forming ballistic resistant composites. Also useful in the practice of this invention is poly(metaphenylene isophthalamide) filaments produced commercially by Dupont under the trade name Nomex.

In the case of liquid crystal copolyesters, suitable filaments are disclosed, for example, in U.S. Pat. Nos. 3,975,487, 4,118,372, and 4,161,470, hereby incorporated by reference. Tenacities of about 15 to 30 g/d, more preferably about 20 to 25 g/d, modulus of about 500 to 1500 g/d, preferably about 1000 to 1200 g/d, and an energy-to-break of at least about 10 J/g are particularly desirable.

A projectile is a body projected by external force and continuing in motion by its own inertia. It may be a fragment of some larger object, e.g., bullets, engine blades, shrapnel, or may be a large object itself. By large projectile is meant a projectile having at least one dimension in the range of about 1 to 24 inches (2.54 to 61.0 cm). Typically, this projectile will have a weight in excess of about 3 pounds (1.4 kg). Projectiles with a high hardness impacting edge, like tungsten or titanium, deform so slightly upon impacting an armor system that they tend to cut and tear the system; this is a cutting projectile. By high hardness is meant a projectile having a Rockwell hardness (ASTM D-785) of 35 to 150 or a Brinell hardness of 50 to 800.

By engaging the projectile is meant that the fibers in the networks forming the layer tend to pull out of their network configuration and wrap around the projectile to entangle it—a substantial portion of the fibers are resistant to cutting/abrading by the projectile, and as a consequence, the projectile is ensnarled by the fibers.

Figures 1, 1A:
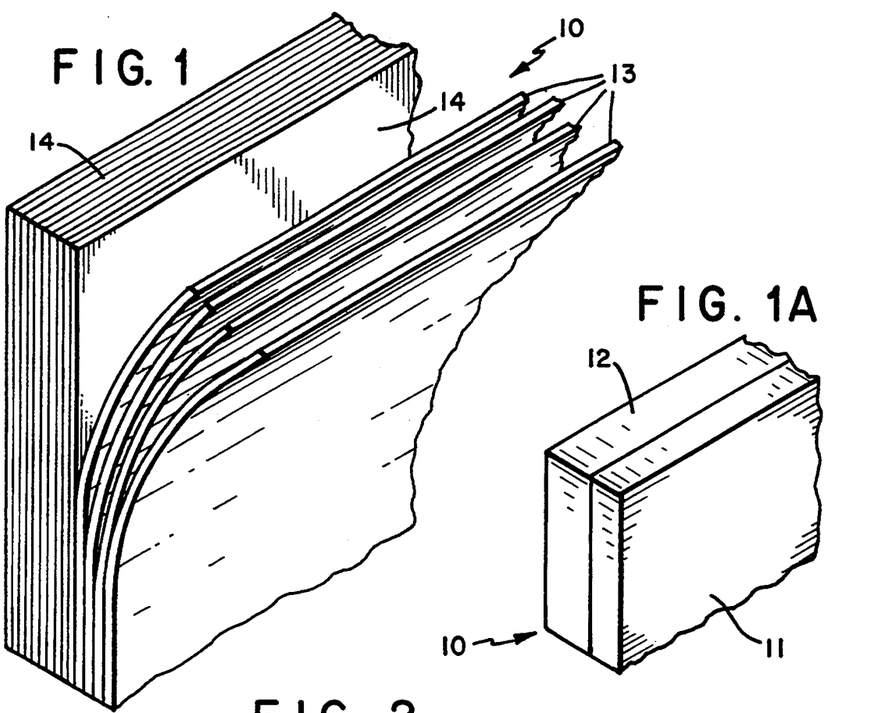
FIGS. 1 and 1A are perspective views of a corner of an armor system of the first embodiment.

In its broadest aspects, see FIGS. 1 and 1A, the invention is directed to a multi-layered fiber-containing article of manufacture 10 comprising at least two layers 11 and 12, each of which is comprised of a plurality of pliable networks of fibers (13 for layer 11 and 14 for layer 12). The multiple networks of fibers may be stitched together as long as they remain pliable. By pliable is meant supple enough to bend freely or repeatedly without breaking.

Figures 2, 2A:
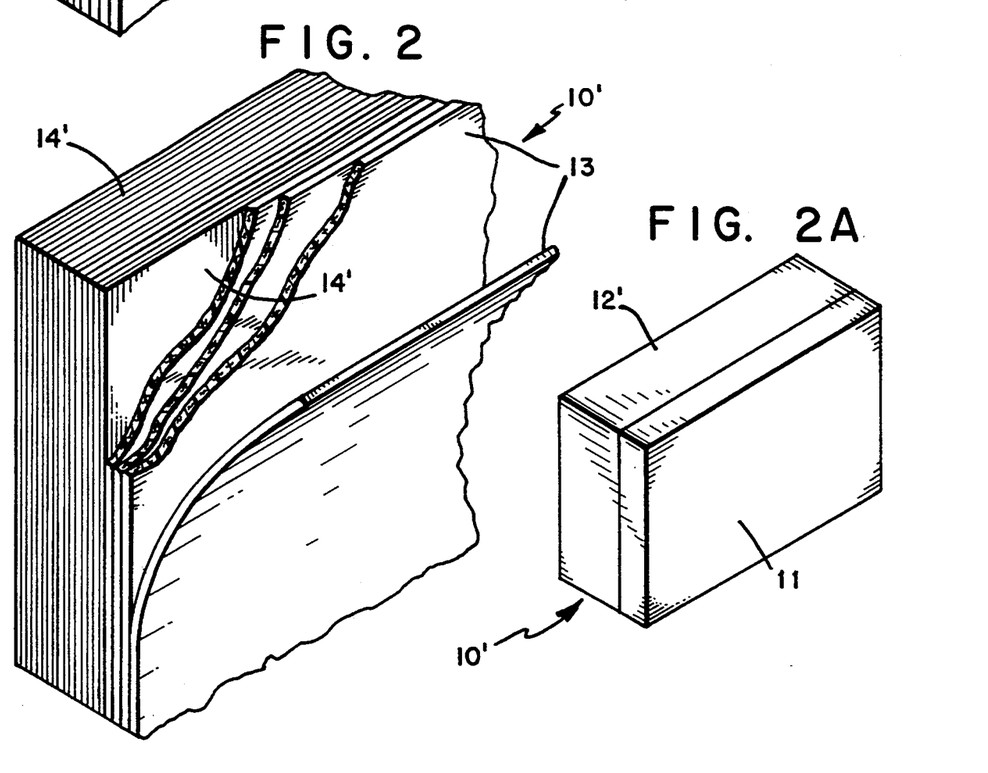
FIGS. 2 and 2A are perspective views of a corner, one layer of which is partially cut away, of an armor system of either the first or second embodiment depending upon the orientation of the layers with respect to the impacting object.

In the armor system of the first embodiment, which is particularly effective in containing large, high velocity cutting projectiles, the first layer 11 is arranged to receive the impact from the projectile and engages the projectile to slow the velocity of the projectile. It is preferred that the first layer 11 comprise a plurality of networks 13 selected from the group consisting of an uncoated nonwoven network of randomly oriented fibers (as shown in FIGS. 1 and 2) and an uncoated, open knitted network of fibers.

The most preferred first layer for this first armor system comprises a plurality of nonwoven networks of randomly oriented fibers, at least one of which comprises discontinuous fiber, preferably staple fiber, having a length ranging from about 0.25 to 10.0 inches (0.63 to 25.4 cm), more preferably from about 1.0 to 8.0 inches (2.54 to 20.3 cm), most preferably from about 2.0 to 6.0 inches (5.1 to 15.2 cm). Generally speaking, within the range of 0.25 to 10.0 inch (0.63 to 25.4 cm) fiber lengths, as the fiber length increases, the ability to engage the projectile, and thus stop/slow the velocity of the projectile, increases.

There are several methods to lay such a completely random and discontinuous network of fibers, for example by carding or fluid laying (air or liquid), as are conventional in the art. Consolidation of the network for handling, i.e., bonding of the network of fibers, can occur by any of the following means: mechanically, e.g., needle punching; chemically, e.g., with an adhesive; and thermally, with a fiber to point bond or a blended fiber with a lower melting point. The preferred consolidation method is needle punching, alone or followed by one of the other methods.

The most preferred nonwoven network comprising discontinuous fiber lengths is a needle punched felt. This is also the most preferred network for use in the first layer. An alternate first layer for this armor system, however, comprises a plurality of knit networks. These networks can be formed by flatbed knitting yarn into an open knit fabric to form one of the fibrous networks.

The second fibrous layer 12 dissipates the incoming energy of the impact, preferably by deformation (netting effect), to prevent total penetration by the projectile through the armor system. Deformation can be measured in one of two fashions, either by the NIJ Standard 0101.03 or visually, as set forth in the accompanying examples. The NIJ maximum permissible deformation is 44 mm. In some European countries, the maximum permissible deformation varies from 20 to 30 mm. This second layer 12 preferably comprises a plurality of networks 14 selected from the group consisting of a loosely woven network of fibers (see FIG. 1), a tightly knitted network of fibers, a braided network of fibers, and a nonwoven network of oriented fibers (see FIG. 2, 14').

A preferred second layer, especially for use in combination with a first layer comprising felt networks (combination shown in FIG. 2), comprises a plurality of nonwoven networks 14' of oriented fibers wherein each network is comprised of a plurality of sheet-like arrays of untwisted fibers with the fibers aligned substantially parallel to one another along a common fiber direction within each array. The fiber alignment directions in selected arrays can be, and preferably are, rotated with respect to the alignment direction of another array. The arrays are preferably individually impregnated with a matrix binder and stacked, as is known in the art. See, for example, allowed U.S. patent application Ser. No. 045,930, filed May 4, 1987, hereby incorporated by reference. It is important that the arrays not be consolidated between networks with the matrix binder since this will stiffen the layer too much. An alternate nonwoven network of oriented fibers comprises interlaced unidirectional fiber tapes or stitch bonded fiber arrays.

A loosely woven network of fibers is one which has a basket style weave or equivalent. The fibers of the loosely woven network have fewer crossover points and thus can respond to the impact without breaking in the networks toward the impact side of the layer. The key to the basket weave is the construction, i.e., the higher the number of ends for weaving, the higher the breaking strength for the fabric. This results in a better performance for larger projectiles. If this fabric is used as the impact face with small projectiles/fragments, the fragments will separate the fibers to penetrate the impact layer.

The braided network of fibers utilized higher denier fibers. Again, the key is the loose construction and the higher denier multifilament system, with the same advantage as stated for loosely woven network layer.

It is preferred that none of the fibrous networks be impregnated other than the nonwoven network of oriented fibers because of stiffness. The layers of the system must be pliable. For the nonwoven network of oriented fibers, the matrix material employed can comprise one or more thermosetting resins, or one or more thermoplastic resins, or a blend of such resins. As used herein "thermoplastic resins" are resins which can be heated and softened, cooled and hardened limitless times without undergoing a basic alteration, and "thermosetting resins" are resins which do not tolerate thermal cycling and which cannot be resoftened and reworked after molding, extruding or casting and which attain new, irreversible properties when once set at a temperature which is critical to each resin.

Preferred thermosetting resins are urethanes, amino resins, acrylics, alkyds, vinylesters, unsaturated polyesters, epoxies and phenolics. Particularly preferred thermosetting resins are vinylesters, epoxies and phenolics, with vinylesters being the thermosetting resin of choice.

Thermoplastic resins for use in the practice of this invention may also vary widely. Illustrative of useful thermoplastic resins are polyurethanes, polyvinyls, polyacrylics, polyolefins, and polyisoprene-polyethylene-butylene-polystyrene or polystyrene-polyisoprenepolystyrene block copolymer thermoplastic elastomers, most preferably the latter.

The proportion of matrix to filament in the network is preferably about 10 to 30%. The filaments preferably are precoated with the desired matrix material prior to being arranged in a network. The coating may be applied to the filaments in a variety of ways and any method known to those of skill in the art for coating filaments may be used. In the most preferred embodiment of this invention, two such impregnated networks are then continuously cross plied, preferably by cutting one of the networks into lengths that can be placed successively across the width of the other network in a 0°/90° orientation.

For an armor system of the first embodiment wherein the fibers consist essentially of a high molecular weight polyethylene, the preferred construction is as follows:

for cutting projectiles of any size and for large projectiles, the first layer comprises a plurality of, preferably about 4 to 100, felt networks each having an areal density of about 4 to 100 oz/yd$^2$ (0.03 to 0.69 lbs/ft$^2$) and having a needle punch density of about 200 to 1800 punches per square inch, and the second layer comprises a plurality of, preferably about 10 to 100, loosely woven (basket weave 8×8) networks having an areal density of about 5 to 35 oz/yd$^2$ (0.04 to 0.24 lbs/ft$^2$).

For an armor system of the first embodiment wherein the fibers consist essentially of a high molecular weight aramid, the preferred construction is as follows: for cutting projectiles of any size and for large projectiles, the first layer comprises a plurality of, preferably about 4 to 100, felt networks each having an areal density of about 4 to 100 oz/yd$^2$ (0.03 to 0.69 lbs/ft$^2$) and having a needle punch density of about 200 to 1300 punches per square inch, and the second layer comprises either a plurality of, preferably about 10 to 100, loosely woven (basket weave 8×8) networks having an areal density of about 5 to 30 ounces/yd$^2$ (0.04 to 0.21 lbs/ft$^2$), or a plurality of, preferably about 10 to 100, braids having an areal density of about 3 to 30 oz/yd$^2$ (0.02 to 0.21 lbs/ft$^2$).

The best hybridized armor system of the first embodiment is as follows: for the first layer, a plurality of, preferably 10 to 80, felt networks consisting essentially of a high molecular weight polyethylene as described above, and for the second layer, a plurality of, preferably 10 to 80, of either braids or loosely woven (basket weave) networks consisting essentially of an aramid as described above.

The networks of each layer may be stitched together with a fiber, preferably a high strength fiber such as is found in the networks forming the system, in a diamond, square or other pattern known in the art, and the layer then laid like a blanket around the object to be shrouded or shielded, followed by subsequent layers. The layers may themselves be also stitched together. It is important that the layers of the armor system remain pliable after stitching. The layers are preferably parallel and adjacent to one another; however, it is considered part of the present invention to space them apart in parallel.

Figure 4:
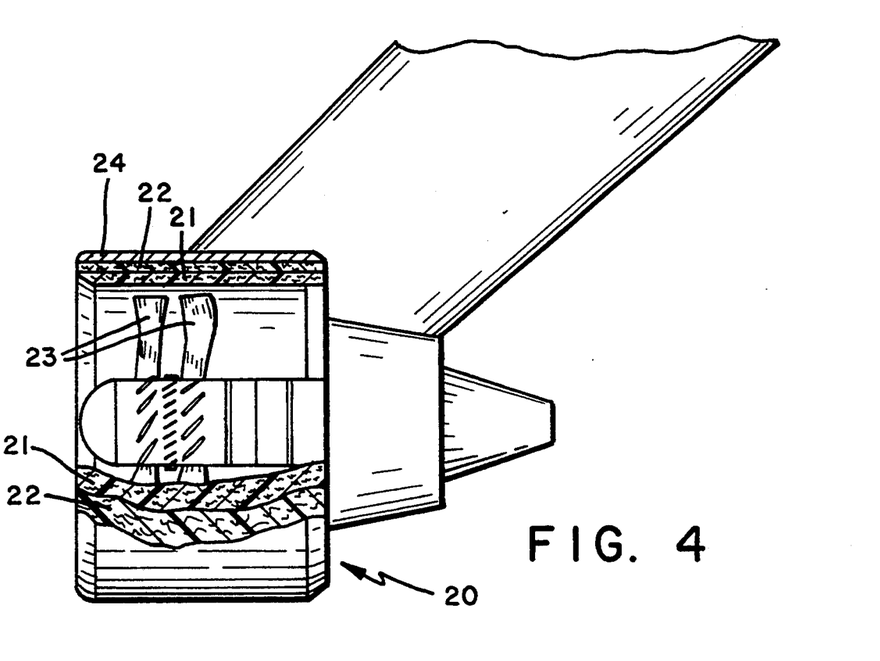
FIG. 4 is a partially cut away perspective view of a high bypass jet engine with the shroud of the present invention in place.

With reference to FIG. 4, the shroud 20 of the preferred embodiment is depicted with the first layer 21 closer to the high velocity cutting impact projectile threat, i.e., the turbine blade 23, and with the second layer 22 between first layer 21 and the nacelle 24, which houses the engine.

In the armor system of the second embodiment, the first layer is arranged to face the impact from the projectile. It dissipates the energy upon the impact via the tensile modulus of the fibers and the breaking strength of the fabric. It is preferred that the first layer comprise a plurality of networks selected from the group consisting of a tightly or loosely woven network of fibers, a knitted, preferably tightly, network of fibers, a braided network of fibers, and a nonwoven network of oriented fibers. These constructions are as described for the second layer of the first embodiment, except for the tightly woven network of fibers, which can be a plain weave construction, e.g., 17×17, 34×34, 56 ×56, etc. FIGS. 1, 1A, 2 and 2A also depict this system as well as that of the first embodiment—the layers are simply switched so that the impacting layer now becomes the non-impact layer and vice versa.

The second layer of this second embodiment minimizes any deformation of the system by the projectile impact to the first layer. And if the projectile penetrates the first layer, the second layer engages the projectile by utilizing the high strength and cut resistant characteristics of the fibers. It is preferred that the second layer of this second embodiment comprise a plurality of networks selected from the group consisting of an uncoated nonwoven network of randomly oriented fibers and an open uncoated knitted network of fibers. These networks are as described for the first layer of the first embodiment above.

For an armor system of the second embodiment wherein the fibers consist essentially of a high molecular weight polyethylene, the preferred construction is as follows: for projectiles smaller than three pounds that are not cutting projectiles, the first layer comprises a plurality of, preferably about 10 to 100, nonwoven networks of resin impregnated 0°/90° cross-plied unidirectional monofilament arrays having an areal density of about 0.5 to 10 oz/yd$^2$ (0.004 to 0.069 lbs/ft$^2$), and the second layer comprises a plurality of, preferably about 2 to 50, felt networks having an areal density of about 0.5 to 30 oz/yd$^2$ (0.004 to 0.21 lbs/ft$^2$) and having a needle punch density of about 300 to 1800 punches per square inch.

For an armor system of the second embodiment wherein the fibers consist essentially of a high molecular weight aramid, the preferred construction is as follows: for projectiles smaller than three pounds that are not cutting projectiles, the first layer comprises a plurality of, preferably about 10 to 100, nonwoven networks of resin impregnated 0°/90° cross-plied unidirectional monofilament arrays having an areal density of about 0.5 to 10 oz/yd$^2$ (0.004 to 0.069 lbs/ft$^2$), and the second layer comprises a plurality of, preferably about 2 to 50, felt networks having an areal density of about 0.5 to 30 oz/yd$^2$ (0.004 to 0.21 lbs/ft$^2$) and having a needle punch density of about 200 to 1300 punches per square inch.

The networks of each layer may be stitched together as in the first embodiment, and the layer then laid like a blanket around the object to be shrouded or shielded, followed by subsequent layers. Again, the layers may themselves be stitched together or spaced apart in parallel. It is also important that the layers of the armor system remain pliable for this embodiment.

Figure 3:
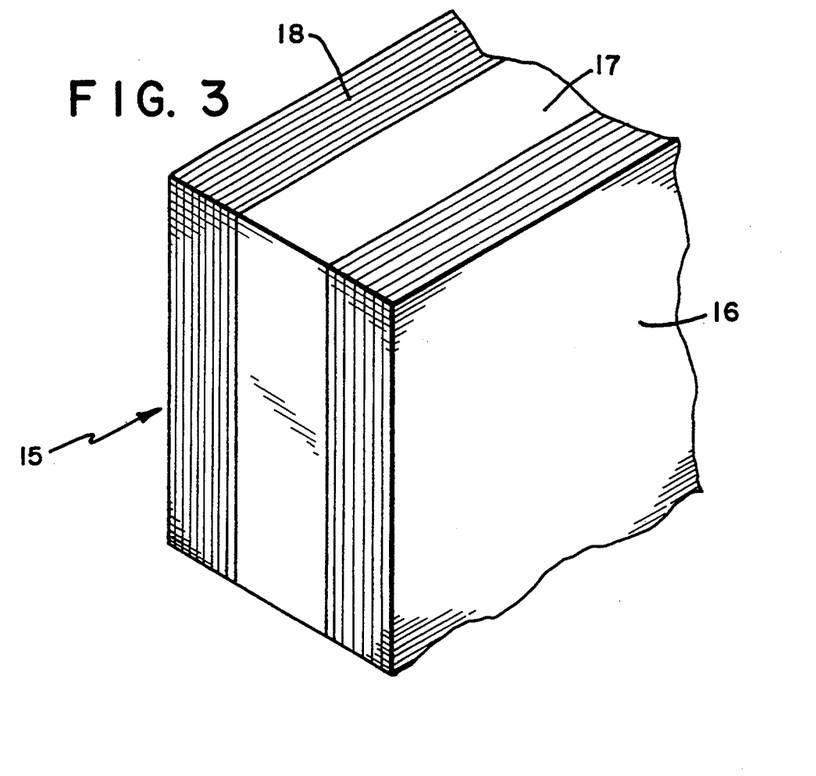
FIG. 3 is a perspective view of a corner of an armor system of the third embodiment of this invention.

For an armor system 15 of the third embodiment (see FIG. 3), the preferred construction is a first felt layer 16 comprising high molecular weight polyethylene fiber, aramid fiber, or a combination of the two; a second loosely woven (basket weave) layer 17 comprising high molecular weight polyethylene fiber, aramid fiber, or a combination of the two; and a third felt layer 18 like the first. The number of networks, their areal densities, and their needle punch densities are as indicated above for the preferred first armor embodiment.

Studies of ballistic armor frequently employ a 22 caliber, non-deforming steel fragment of specified weight, hardness and dimensions (Mil-Spec. MIL-P-46593A(ORD)). The protective power of a structure is normally expressed by citing the impacting velocity at which 50% of the projectiles are stopped, and is designated the $V_{50}$ value.

The following examples are presented to provide a more complete understanding of the invention. In the Examples, the impact cam cut test is performed using the method and BETATEC~ testing apparatus of U.S. Pat. No. 4,864,852, hereby incorporated by reference.

The test involves repeatedly contacting a sample with a sharp edge until the sample is penetrated by the cutting edge. The higher the number of cutting cycles (contacts) required to penetrate the sample, the higher the reported cut resistance of the sample. During testing, the following conditions were used, unless otherwise specified: 90 grams cutting weight, mandrel speed of 50 rpm, rotating steel mandrel diameter of 19 mm (0.75 inch), cutting blade drop height of about 8.9 mm (0.35 inch), use of a single-edged industrial razor blade (Red Devil brand) for cutting, cutting arm distance from pivot point to center of blade being about 15.2 cm (about 6 inches). The impact cam cut test allows for a cutting edge to abruptly impact a sample. The networks were cut tested after cutting samples 2×3.5 inches and wrapping them on the tester mandrel. The samples were held on the mandrel with 2 band clamps placed over each end.

The level of cut resistance required of the cut resistant networks of the present invention is at least 5 cycles of the impact cam cut test. Because of the openness of a loosely knit network, this test is not a good test for cut resistance. However, if the knit yarns are cut resistant then it would follow that the network would possess the requisite cut resistance for this invention.

In Examples 5–16, the armor systems were tested with a gas gun by the Impact Physics Laboratory at the University of Dayton, Ohio, for the General Electric Company. The projectile was a titanium blade 2 inches wide, 6 inches long and 3/16 inch thick, and weighing 183 g. The soft armor systems of those examples were 12×18 inches, and a one inch boundary of the system along its perimeter was impregnated with an epoxy resin to make it rigid. The system was then attached to a metal frame with bolts at the four corners and in the rigid boundary. The system in the frame was inclined towards the gas gun at an angle of approximately 30° from the axis of the gas gun's barrel. It is believed that the test sample was approximately 10 feet from the barrel of the gun. The blade was shot into the middle of the system either at a velocity of 430 ft/sec (level 1) or 600 ft/sec (level 2). Failure meant that the projectile completely penetrated the system.

It should be understood that the armor systems of Examples 5–19, the projectile, and the test system were all scaled down due to the overwhelming expense involved in replicating the high velocity cutting impact of a large projectile such as a turbine blade. The projectile described above simulates a large projectile, i.e., one weighing about 3 pounds and flying at a velocity of about 3000 feet per second.

EXAMPLES 1–2 (COMPARATIVE)

In Example 1, 32 networks of Spectra® 1000 8H satin weave fabric style 985, commercially available from Allied-Signal Corporation, were stitched together in a diamond shape pattern to produce a test sample having an areal density of 176 oz/yd$^2$ (1.22 lb/ft$^2$). In Example 2, a 25 network system was produced just as in Example 1, but having an areal density of 138 oz/yd$^2$ (0.960 lb/ft$^2$).

Both of these systems were submitted to a 22 caliber 17 grain FSP evaluation test according to MIL-STD-662E. In Example 1, a $V_{50}$ value of 1797 fps was obtained, while in Example 2, a $V_{50}$ value of 1611 fps was obtained. Visual observation of the non-impact side of these samples revealed significant deformation (or deflection) of each of the systems.

EXAMPLES 3(COMPARATIVE)–4

One layer was comprised of 5 felt networks each having an areal density of about 8 oz/yd$^2$ (0.0556 lbs/ft$^2$) and having a needle punch density of about 500 punches per square inch. The fiber used in these felt networks was Spectra® 1000 2.75 inch (7.0 cm) staple, commercially available from Allied-Signal Corporation. The fiber was carded and cross lapped to a 60 inch (1.52 m) width. The carded webs were stacked up by the cross lapper to produce an 8.0 ounce per square yard fabric, as is known in the art. The fabric was tacked and needled (300 punches per square inch with a #10 needle), and then taken up into a roll. The off line needle punching used a #100 needle and a needle punch density of 200 punches per square inch.

The other layer was comprised of 20 networks of Spectra® 1000 8H satin weave fabric style 985, commercially available from Allied-Signal Corporation, and having an areal density/weight? of about 5.5 oz/yd$^2$ (0.038 lb/ft$^2$).

The two layers were stitched together in a diamond shape pattern. The total areal density for the system was 1.037 lb/ft$^2$.

In Example 3, the felt layer was facing the incoming projectile. The sample was submitted to a 22 caliber 17 grain FSP test following MIL STD-662E. A $V_{50}$ of 1676 fps was obtained. Visual observation of the non-impact side of the sample revealed significant deformation of the system.

In Example 4, the fabric layer was facing the incoming projectile for testing in accordance with Example 1. A $V_{50}$ of 1892 fps was obtained. Visual observation of the non-impact side of the sample revealed little deformation of the system, and it was estimated that deformation of the system was approximately 80% less than that for Example 3.

EXAMPLE 5 (COMPARATIVE)

In this example, 20 networks of Spectra® 1000 fabric style 954, 56×56 plain weave (185 denier), commercially available from Allied-Signal Corporation, were put together to produce a test sample having an areal density of 54.0 oz/yd$^2$ (0.37 lb/ft$^2$). At level 1, the system failed.

EXAMPLE 6 (COMPARATIVE)

Example 5 was repeated, except that 30 networks of fabric were used, and the total areal density of the sample was 80.3 oz/yd$^2$ (0.55 lb/ft$^2$). At level 1, this system also failed.

EXAMPLE 7 (COMPARATIVE)

In this example, 28 networks of Spectra Shield (made from Spectra 1000 and commercially available from Allied-Signal Corporation) were consolidated into a rigid test sample having an areal density of 0.748 lb/ft$^2$. At level 1, this system stopped the projectile.

EXAMPLE 8 (COMPARATIVE)

Example 7 was repeated, except that 42 networks of Spectra Shield were consolidated into a rigid test sample having an areal density of 1.12 lb/ft$^2$. At level 2, this system failed.

EXAMPLE 9 (COMPARATIVE)

In this example, 18 networks of Spectra ®900 fabric style 913 (1200 denier), basket weave 8×8, 48×48, commercially available from Allied-Signal Corporation, were put together to produce a test sample having an areal density of 1.91 lb/ft$^2$. At level 2, this system stopped the projectile; however, visual inspection of the non-impact side of the sample showed significant deformation of the system.

EXAMPLE 10

One layer was comprised of 4 felt networks each having an areal density of about 5 oz/yd$^2$ (0.0345 lb/ft$^2$) and having a needle punch density of about 500 punches per square inch, as previously described. The fiber used in these felt networks was Spectra ® 1000 2.75 inch (7.0 cm) staple, commercially available from Allied-Signal Corporation.

The other layer was comprised of 17 networks of Spectra ® 900 basket weave (8×8) fabric style 913, commercially available from Allied-Signal Corporation, and each having an areal density of about 15.5 oz/yd$^2$ (0.106 lb/ft$^2$). The total areal density for the system was 1.97 lb/ft$^2$.

These two layers were formed into a system for testing, and the felt layer was facing the incoming projectile. At level 2, this system performed better than Example 9 above, and without significant deformation.

EXAMPLE 11 (COMPARATIVE)

In this example, 42 networks of Kevlar ® 29 fabric style 328, plain weave, 17×17, 1420 denier, commercially available from DuPont Corporation, were put together to produce a test sample equivalent by weight to the sample in Example 9, i.e., 1.95 lb/ft$^2$. At level 2, this system stopped the projectile; however, visual inspection of the non-impact side of the sample showed significant deformation of the system.

EXAMPLE 12

One layer was comprised of a plurality of Spectra ® 1000 (2.75 inch staple) felt networks. The other layer was comprised of a plurality of Kevlar ® 29 fabric networks as described in Example 11.

It is believed that the number of felt networks numbered between 9 and 3 and that the felt layer had a total areal density in the range of about 44.96 to 14.89 oz/yd$^2$ (0.308 to 0.102 lb/ft$^2$). It is believed that the number of fabric networks numbered between 35 and 40 and had a total areal density of about 237.96 to 271.53 oz/yd$^2$ (1.63 to 1.86 lb/ft$^2$). The total areal density for the system is believed to have been about 284.7 oz/yd$^2$ (1.95 lb/ft$^2$), which is comparable to the systems of Examples 9 and 10.

The two layers were formed into a system for testing with the felt layer facing the incoming projectile. At level 2, this system performed equivalent to Example 10 above.

EXAMPLE 13

One layer was comprised of a plurality of Kevlar ® 29 (2.75 inch staple) felt networks. The other layer was comprised of a plurality of Spectra ® 900 basket weave (8 ×8) fabric style 913 networks, commercially available from Allied-Signal Corporation.

It is believed that the number of felt networks numbered between 10 and 4 and that the felt layer had a total areal density of about 50 to 20 oz/yd$^2$ (0.342 to 0.137 lb/ft$^2$). It is believed that the number of fabric networks numbered between 15 and 17 and had a total areal density of about 102.0 to 115.6 oz/yd$^2$ (1.59 to 1.80 lb/ft$^2$). The total areal density for the system is believed to have been about 284.7 oz/yd$^2$ (1.95 lb/ft$^2$), which is comparable to the systems of Examples 9 and 10.

The two layers were formed into a system for testing with the felt layer facing the incoming projectile. At level 2, this system had a performance similar to Example 10 above.

EXAMPLE 14

In this example, the test sample was made with a plurality of braided networks formed from Spectra ® 1000, 650 denier yarn. The total areal density of the system is believed to have been about 284.7 oz/yd$^2$ (1.95 lb/ft$^2$).

At level 2, this system had good performance.

EXAMPLE 15

One layer is comprised of a plurality of Spectra ® 1000 (2.75 inch) felt networks having a total areal density of about 15 to 60 oz/yd$^2$ (0.1 to 0.4 lb/ft$^2$).

The other layer is comprised of a plurality of Spectra ® 1000, 650 denier, braided networks having a total areal density of about 270 to 226 oz/yd$^2$ (1.85 to 1.55 lb/ft$^2$).

The two layers are formed into a system having a total areal density of about 284.7 oz/yd$^2$ (1.95 lb/ft$^2$) for testing with the felt layer facing the incoming projectile. At level 2, this system is expected to perform better than Example 14 above.

EXAMPLE 16

In this example, the test sample was made with a plurality of braided networks formed from a composite yarn. The composite yarn was formed by laying a 650 denier Spectra ® 1000 fiber parallel to a 400 denier glass fiber and then overwrapping the two in one direction with a 650 denier Spectra ® 1000 fiber followed by overwrapping in the opposite direction with a second 650 denier Spectra ® 1000 fiber. The total areal density of the system is believed to have been about 284.7 oz/yd$^2$ (1.95 lb/ft$^2$).

At level 2, this system had good performance.

EXAMPLE 17

One layer is comprised of from about 10 to 4 networks formed by flatbed knitting (open knit) a composite yarn as described in Example 16. The total areal density of the layer is about (0.1 to 0.4 lb/ft$^2$).

The other layer is comprised of from about 15 to 17 networks of Spectra ® 900 basket weave (8×8, 48×48) fabric style 913 networks having a total areal density of about 102.0 to 115.6 oz/yd$^2$ (1.59 to 1.80 lb/ft$^2$). The total areal density for the system should be about 284.7 oz/yd$^2$ (1.95 lb/ft$^2$).

The two layers are formed into a system for testing with the knitted layer facing the incoming projectile. At level 2, it is anticipated that performance of the system will be good.

EXAMPLE 18

One layer is comprised of from 10 to 4 networks of Spectra ® 1000 (2.75 inch staple) felt networks having a total areal density of about 50 to 20 oz/yd$^2$ (0.342 to 0.137 lb/ft$^2$).

The other layer is comprised from 48 to 52 knitted (tighter knit) networks of the composite yarn of Example 16 having a total areal density of about 102.0 to 115.6 oz/yd$^2$ (1.59 to 1.80 lb/ft$^2$). The total areal density for the system is believed to be about 284.7 oz/yd$^2$ (1.95 lb/ft$^2$).

The two layers are formed into a system for testing with the felt layer facing the incoming projectile. At level 2, it is anticipated that performance will be good.

EXAMPLE 19

One layer is comprised of from 10 to 4 networks of Spectra ® 1000 (2.75 inch staple) felt networks having a total areal density of about 50 to 20 oz/yd$^2$ (0.342 to 0.137 lb/ft$^2$).

The other layer is comprised of from about 55 to 61 networks of Spectra Shield (made from Spectra ® 1000 and commercially available from Allied-Signal Corporation) having a total areal density of about 102.0 to 115.6 oz/yd$^2$ (1.59 to 1.80 lb/ft$^2$). The total areal density for the system is believed to be about 284.7 oz/yd$^2$ (1.95 lb/ft$^2$).

The two layers are formed into a system for testing with the felt layer facing the incoming projectile. At level 2, it is anticipated that performance will be good.

EXAMPLE 19

In this example, needle punched felt networks of high molecular weight polyethylene fiber, polyester fiber and nylon fiber were tested for impact cam cut performance. The polyethylene felt network was as described in Example 4 (5 dpf) and had a cut resistance of 10.7 cycles on the impact cam cut test previously described. Two 4 oz/yd$^2$ polyester felts (1 inch, 6 dpf), lightly tacked together, were also tested and had a cut resistance of 4.7 cycles on the same test. A nylon felt (4 oz/yd$^2$, 2 inches, 3.5–4 dpf) was tested and had a cut resistance of 1 cycle on the test. The cut test data represents the average of at least 6 tests. It is believed that aramid felts, particularly poly(p-phenylene terephthalamide), would have an impact cam cut resistance in excess of 5 cycles.

DISCUSSION

From the above examples, it can be seen that the two layer armor systems of the present invention for large, high velocity cutting projectiles performed better than the single layer systems. Within these two layer armor systems, it can be seen that the combination of felt networks for the first layer and braided networks for the second layer were the best.

Examples 1 through 4 show the importance of the second layer of the two layer armor system of the present invention for resistance to smaller projectiles. With felt networks forming the second layer (away from the impacting projectile), deformation is minimized and complete penetration of the system stopped.

We claim:

1. An armor system comprising a first pliable, cut resistant fibrous layer and a second pliable fibrous layer substantially coextensive with said first layer, the first layer being arranged to receive an impact from a projectile prior to the second layer and engaging the projectile to slow its velocity, the second layer dissipating the incoming energy of the impact to resist complete penetration of the second layer by the projectile, both of said first and second layers comprising fibers having a tensile modulus of at least about 200 g/d, and an energy-to-break of at least about 8 J/g and a tenacity equal to or greater than about 10 g/d, wherein the first layer comprises an uncoated needle punched felt of discontinuous fibers having a length ranging from about 0.25 to 10.0 inches (0.63 to 25.4 cm) and the second layer comprises a network of one type selected from the group consisting of a nonwoven network of oriented fibers and a plurality of nonwoven networks of oriented fibers.

2. The system of claim 1 wherein the second layer comprises a plurality of nonwoven networks of oriented fibers.

3. The system of claim 2 wherein each of said nonwoven networks is comprised of a plurality of sheet-like arrays of said fibers, said fibers in each array being aligned substantially parallel to one another in each array along a common fiber direction within each array.

4. The system of claim 3 wherein the fiber alignment directions in selected arrays are rotated with respect to the alignment direction of another array.

5. The system of claim 4 wherein said arrays are individually coated with a matrix binder.

6. The system of claim 1 wherein the networks of said second layer comprise interlaced unidirectional fiber tapes.

7. The system of claim 1 wherein the fibers of at least one of said first and second layers are polyethylene.

8. The system of claim 1 wherein the fibers have said tenacity equal to or greater than about 22 g/d, said tensile modulus equal to or greater than about 900 g/d and said energy-to-break equal to or greater than about 27 J/g.

9. The system of claim 1 wherein the fibers have said tenacity equal to or greater than about 35 g/d, said tensile modulus equal to or greater than about 1500 g/d and said energy-to-break equal to or greater than about 50 J/g.

10. The system of claim 1 wherein said fibers are selected from the group consisting of polyolefin fibers, polyvinyl alcohol fibers, aramid fibers, polyacrylonitrile fibers, liquid crystalline fibers, and mixtures thereof.

11. The system of claim 10 wherein the fibers have said tenacity equal to or greater than about 22 g/d, said tensile modulus equal to or greater than about 900 g/d and said energy-to-break equal to or greater than about 27 J/g.

12. The system of claim 1 wherein said second layer comprises a nonwoven network of oriented fibers comprised of a plurality of sheet-like arrays of said fibers, said fibers in each array being aligned substantially parallel to one another in each array along a common fiber direction within each array.

13. The system of claim 12 wherein the fiber alignment directions in selected arrays are rotated with respect to the alignment direction of another array.

14. The system of claim 13 wherein said arrays are individually coated with a matrix binder.

* * * * *